United States Patent [19]
Schmillen

[11] Patent Number: 6,041,673
[45] Date of Patent: Mar. 28, 2000

[54] DUAL FUNCTION THROTTLE CONTROL SYSTEM FOR HEAVY CONSTRUCTION EQUIPMENT MACHINES

[75] Inventor: Edward E. Schmillen, Metamora, Ill.

[73] Assignee: Caterpillar Inc., Peoria, Ill.

[21] Appl. No.: 09/216,190

[22] Filed: Dec. 18, 1998

[51] Int. Cl.[7] .......................... G05G 11/00; G05G 1/14; F01B 25/02
[52] U.S. Cl. ............................. 74/482; 74/481; 74/491; 74/513; 91/6
[58] Field of Search ................ 74/481, 482, 491, 74/512, 513; 91/6

[56] References Cited

U.S. PATENT DOCUMENTS

| | | |
|---|---|---|
| 2,730,214 | 1/1956 | Scott . |
| 3,040,596 | 6/1962 | Shane et al. . |
| 3,331,479 | 7/1967 | Pascual . |
| 3,383,938 | 5/1968 | Hollub . |
| 3,709,338 | 1/1973 | Glen ........................ 192/3 S |
| 3,917,013 | 11/1975 | Orr ............................ 180/6.7 |
| 4,042,052 | 8/1977 | Koch ......................... 180/6.7 |
| 4,116,214 | 9/1978 | Koch ......................... 137/522 |
| 4,179,949 | 12/1979 | Hildebrecht .................. 74/474 |
| 4,240,308 | 12/1980 | Berggren ..................... 74/512 |
| 4,273,211 | 6/1981 | Sarmiento ................... 180/333 |
| 4,553,626 | 11/1985 | Kazmierczak et al. ......... 180/307 |
| 5,056,615 | 10/1991 | Duthie et al. ................ 180/306 |
| 5,086,891 | 2/1992 | Rinder ........................ 192/1.56 |
| 5,136,899 | 8/1992 | Hoch et al. .................. 74/878 |
| 5,216,935 | 6/1993 | Shimamura et al. ............ 74/512 |

*Primary Examiner*—Allan D. Herrmann
*Attorney, Agent, or Firm*—Randal L. Shoemaker

[57] ABSTRACT

A dual function throttle control system is disclosed for earthmoving machines. The throttle control system includes a hand lever that is electrically connected to a proportional directional hydraulic valve. Rotation of the hand lever controls actuation of an engine speed actuator and thus the speed of the engine. A foot pedal is connected through a three position spring-centered hydraulic valve to the engine speed actuator. The direction of flow of hydraulic fluid through the three position spring-centered hydraulic valve is controlled by the position of the hand lever. When the hand lever is set at the lowest speed setting, rotation of the foot pedal in a first direction increases the engine speed. When the control lever is set at the highest speed setting, rotation of the foot pedal in the first direction decreases the speed of the engine. Thus, the foot pedal operates both as a decelerator or an accelerator depending on the position of the hand lever.

5 Claims, 3 Drawing Sheets

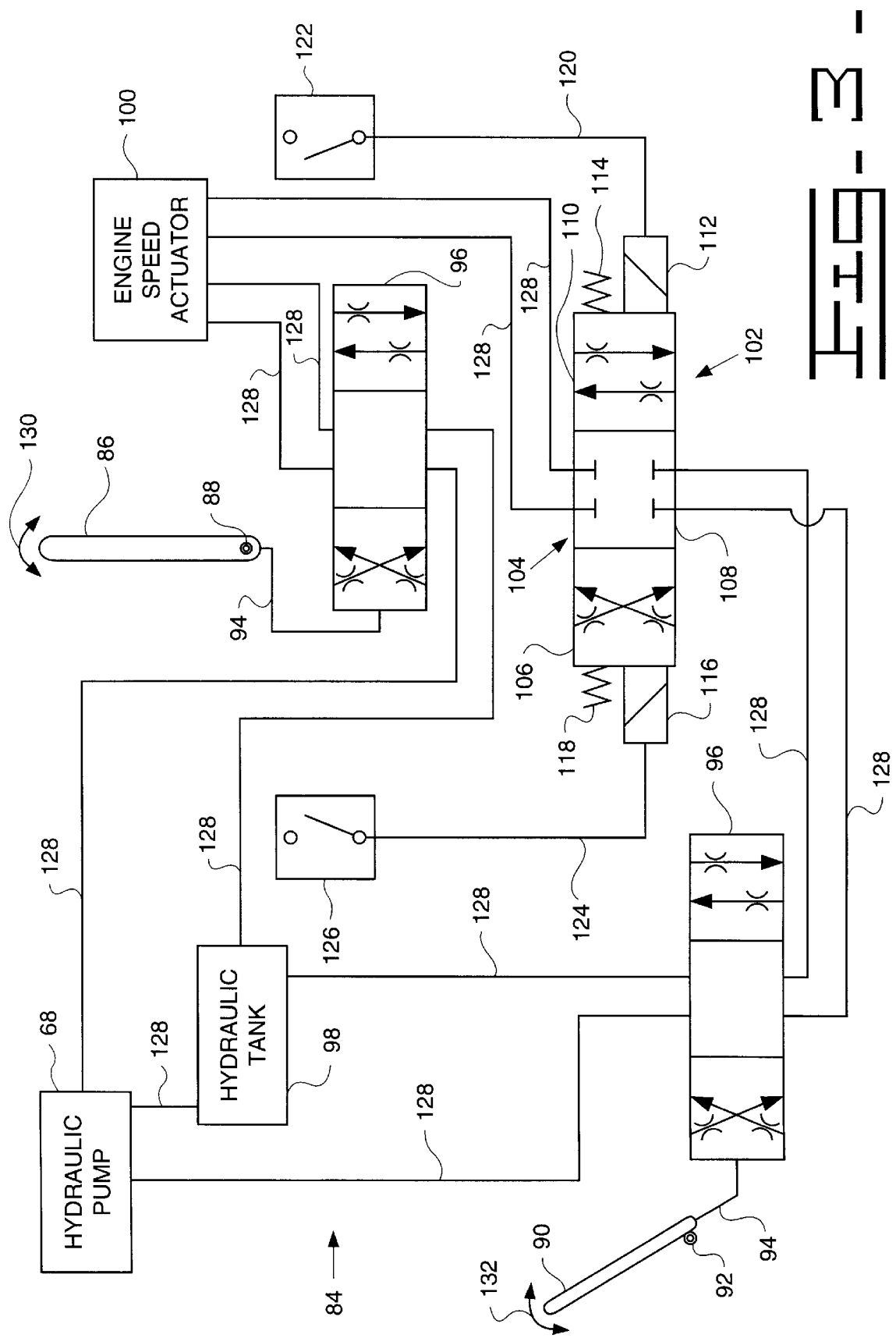

DUAL FUNCTION THROTTLE CONTROL SYSTEM FOR HEAVY CONSTRUCTION EQUIPMENT MACHINES

TECHNICAL FIELD

This invention relates generally to earthmoving machines and specifically to earthmoving machines that include dual function throttle controls.

BACKGROUND ART

This invention relates generally to earthmoving machines that include two mechanisms for controlling the speed of the machine.

Earthmoving machines such as motor graders and wheel loaders include many hand-operated controls to perform functions such positioning an implement or a blade in several orientations, articulating the frame of the machine, and adjusting other machine settings. In many of these earthmoving machines control of the speed of the machine is controlled by a throttle hand lever that acts through the hydraulic system of the machine to actuate an engine speed actuator.

Current earthmoving machines require numerous hand controls because typically each hand control is used to control only one or two functions. Often, the operator of the machine must steer the machine and control its speed while performing many other functions, such as adjusting the blade tip, adjusting the blade angle relative to the frame, adjusting other implements, and adjusting the articulation of the machine frame. Performing all of these functions using the hand controls while controlling the speed using a throttle hand lever is difficult, inefficient, and fatiguing for the operator. To reduce difficulty, increase efficiency, and reduce operator fatigue, it is desirable to provide a dual function throttle control system that permits an operator to control the speed of a machine without requiring the operator to release the hand controls that control machine implements.

Training a new operator to operate a motor grader requires a great deal of time because of the complexity of motor graders. Frequently the operator will have first been trained to operate simpler earthmoving machines such as for example bulldozers. The typical bulldozer includes a decelerator in addition to a throttle hand lever. Thus, it is also desirable to provide a dual function throttle control including a decelerator that can be used in a motor grader to simplify training of motor grader operators.

DISCLOSURE OF THE INVENTION

The present invention provides an efficient dual function throttle control system for earthmoving machines such as motor graders, wheel loaders, excavators, and the like. The system permits the speed of the machine to be adjusted by two mechanisms that can be selected by the operator.

In a preferred embodiment, the dual function throttle control system comprises a foot pedal connected to a three position spring centered hydraulic valve. The three position spring centered hydraulic valve is further connected to an engine speed actuator and is movable between a first position, a second position, and a third position. The three position spring centered hydraulic valve is closed when it is at the first position. Rotation of the foot pedal in a first direction when the three position spring centered hydraulic valve is at the second position increases the actuation of the engine speed actuator and thereby increases the speed of the motor grader. Rotation of the foot pedal in the first direction when the three position spring centered hydraulic valve is at the third position decreases actuation of the engine speed actuator and thereby decreases the motor grader speed.

In the preferred embodiment the dual function throttle control system further comprises a first switch connected to a first solenoid having a first spring and a second switch connected to a second solenoid having a second spring. The first switch and the second switch are actuatable by a hand lever. The hand lever increases actuation of the engine speed actuator when rotated in a first direction and decreases actuation of the engine speed actuator when rotated in a second direction opposite the first direction. Actuation of the first switch by the hand lever actuates the first solenoid and the actuated first solenoid moves the three position spring centered hydraulic valve to the second position. Actuation of the second switch by the hand lever actuates the second solenoid and the actuated second solenoid moves the three position spring centered hydraulic valve to the third position. The first spring and the second spring maintain the three position spring centered hydraulic valve at the first position when the first solenoid and the second solenoid are not actuated.

Thus, the present invention permits an operator to control the speed of a machine while maintaining control of electronic hand controls that are used to control other machine functions. In addition, the present invention simplifies training a new operator to operate a motor grader.

BRIEF DESCRIPTION OF THE DRAWINGS

FIG. 3 is a schematic diagram of a dual function throttle control system designed in accordance with the present invention.

BEST MODE FOR CARRYING OUT THE INVENTION

In this specification the present invention will be described as it would be used in a motor grader. As will be understood by one of ordinary skill in the art, the present invention would be readily adaptable to use in other earthmoving machines such as wheel loaders, excavators, and the like.

Figure 1:
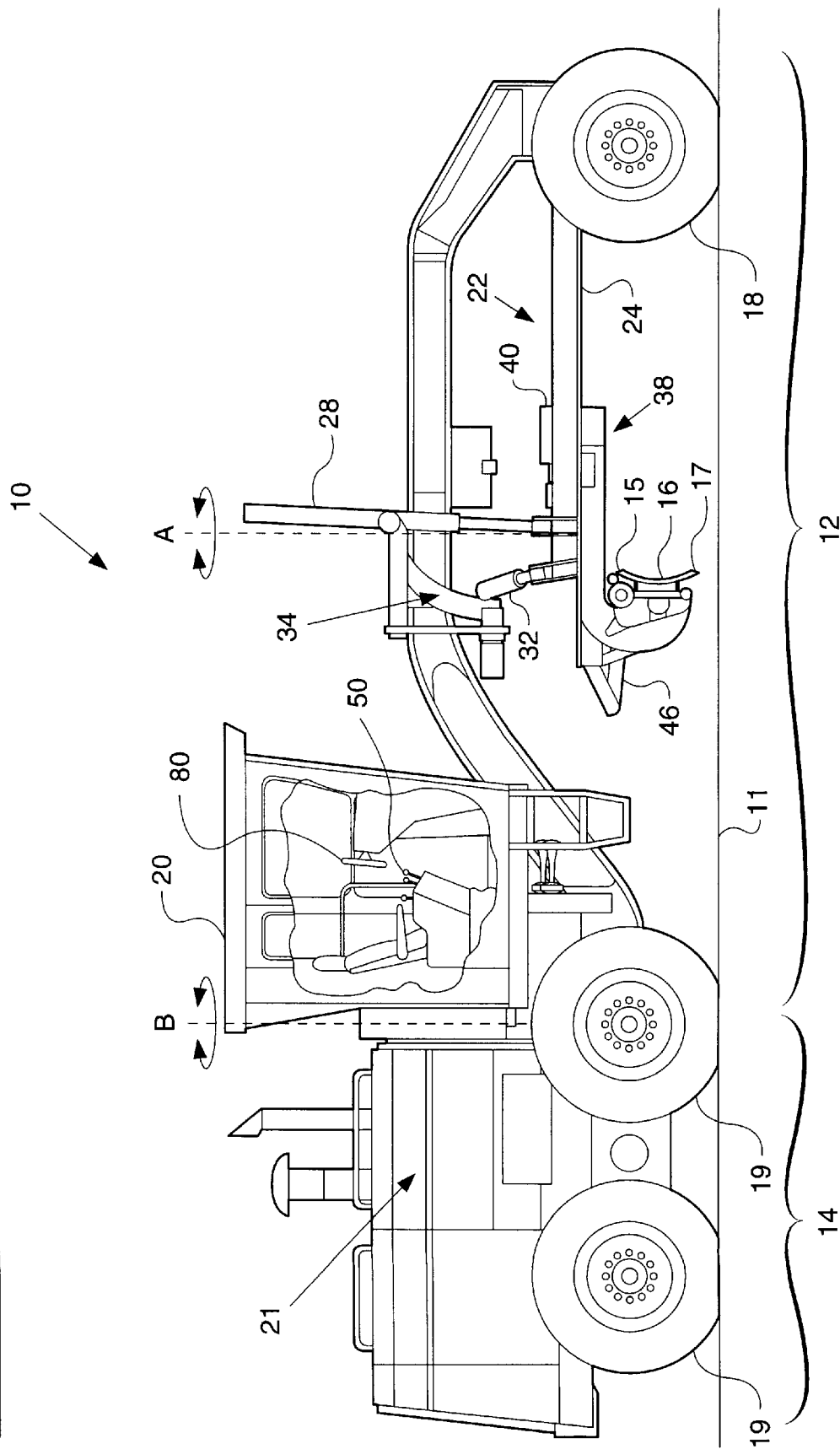
FIG. 1 is a side view of a motor grader.
Figure 2:
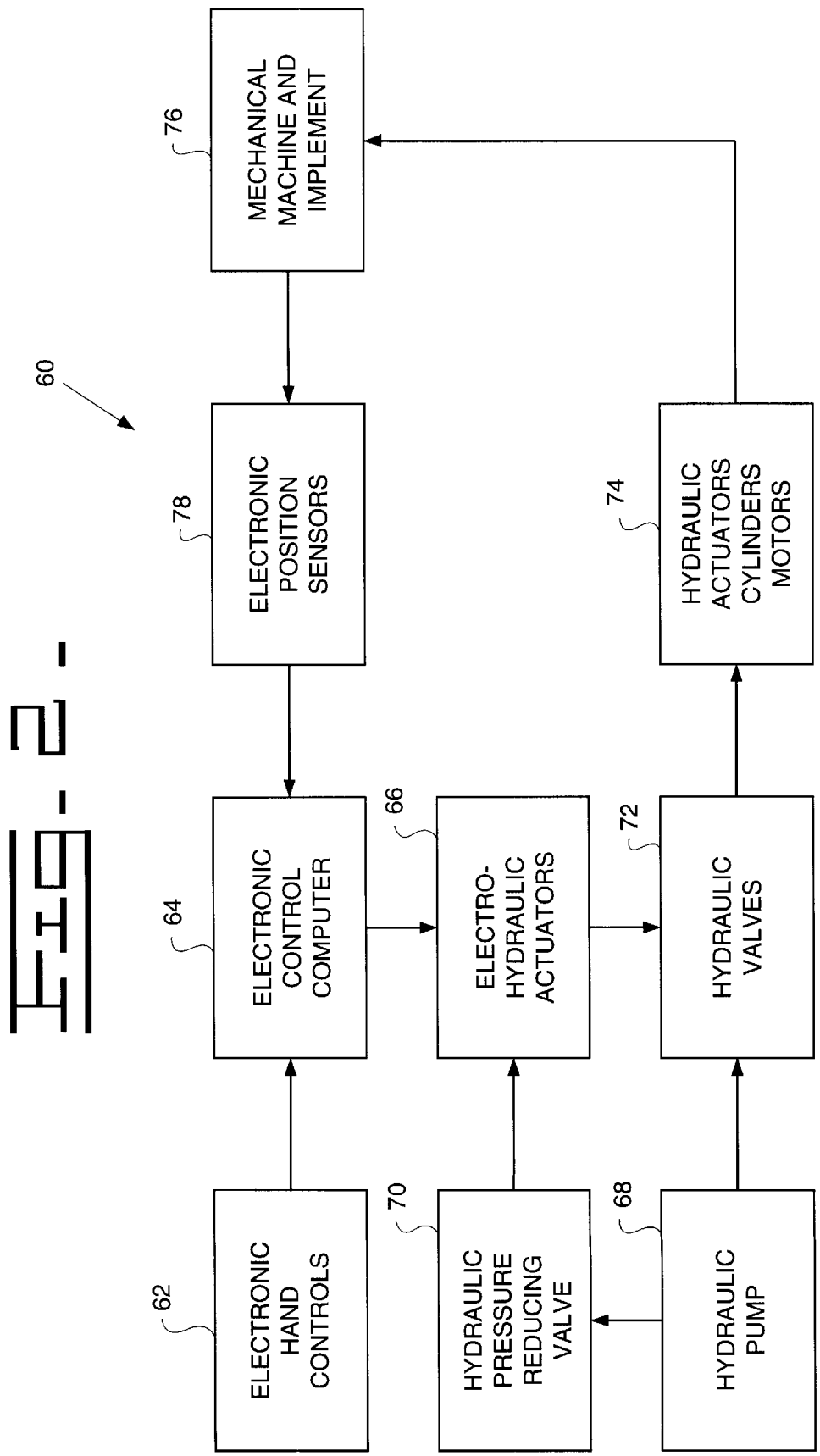
FIG. 2 is a schematic block diagram of an electro-hydraulic control system for the motor grader.

Referring to the Figures, wherein like numerals indicate like or corresponding parts throughout the several views, a motor grader is shown generally at 10 in FIGS. 1 and 2. The motor grader 10 is used primarily as a finishing tool to sculpt a surface of earth 11 to a final arrangement. Rather than moving large quantities of earth in the direction of travel like other machines, such as a bulldozer, the motor grader 10 moves relatively small quantities of earth from side to side.

The motor grader 10 includes a front frame 12, a rear frame 14, and a blade 16 having a top 15 and a cutting edge 17. The front and rear frames 12 and 14 are supported by front tires 18 and rear tires 19. An operator cab 20 containing the many controls including a steering wheel 80 and a plurality of electronic hand controls 50 necessary to operate the motor grader 10 is mounted on the front frame 12. An engine, shown generally at 21, is used to drive or power the motor grader 10. The engine 21 is mounted on the rear frame 14. The blade 16, sometimes referred to as a moldboard, is used to move earth. The blade 16 is mounted on a linkage assembly shown generally at 22. The linkage assembly 22 allows the blade 16 to be moved to a variety of different positions with respect to the motor grader 10. Starting at the front of the motor grader 10 and working rearward toward the blade 16, the linkage assembly 22 includes a drawbar 24.

The drawbar 24 is mounted to the front frame 12 with a ball joint. The position of the drawbar 24 is controlled by three hydraulic cylinders, commonly referred to as a right lift cylinder 28, a left lift cylinder 30, and a center shift cylinder 32. A coupling, shown generally at 34, connects the three cylinders 28, 30, and 32 to the front frame 12. The coupling 34 can be moved during blade repositioning but is fixed stationary during earthmoving operations. The height of the blade 16 with respect to the surface of earth 11 below the motor grader 10, commonly referred to as the blade height, is controlled primarily with the right lift cylinder 28 and the left lift cylinder 30. Each lift cylinder, 28 and 30, functions to raise and lower the associated end of the blade 16. Thus, the right lift cylinder 28 raises and lowers the right end of blade 16. The center shift cylinder 32 moves the drawbar 24 from side to side relative to the front frame 12.

The drawbar 24 includes a large, flat plate commonly referred to as a yoke plate 36, as shown in FIG. 2. Beneath the yoke plate 36 is a large gear, commonly referred to as a circle 38. The circle 38 is rotated by a hydraulic motor commonly referred to as a circle drive 40, as shown in FIG. 1. Rotation of the circle 38 by the circle drive 40 pivots the blade 16 about an axis A fixed to the drawbar 24. The blade 16 is mounted to a hinge (not shown) on the circle 38 with a bracket (not shown). A hydraulic blade tip cylinder 46 is used to pitch the bracket forward or rearward and thus pitch the top 15 of the blade 16 forward and rearward relative to the cutting edge 17. The blade 16 is mounted to a sliding joint in the bracket allowing the blade 16 to be slid or shifted from side to side with respect to the bracket.

FIG. 2 is a schematic block diagram of an electro-hydraulic control system 60 for the motor grader 10. Other earthmoving machines such as wheel loaders have similar electro-hydraulic control systems to that described below. The control system 60 is designed to operate the various hydraulic controls of the motor grader 10 described above. The system 60 includes a plurality of electronic hand controls such as joysticks represented by block 62, which transform the actions of an operator's hands on the hand controls into a plurality of electrical input signals. These input signals carry operational information to an electronic control computer, represented by block 64.

The control computer 64 receives the electrical input signals produced by the hand controls 62, processes the operational information carried by the input signals, and transmits control signals to a plurality of drive solenoids, each of which is located in an electro-hydraulic actuator, represented by block 66.

The hydraulic portion of the control system 60 requires both high hydraulic pressure and low pilot pressure. High hydraulic pressure is provided by a hydraulic pump, represented by block 68. The hydraulic pump 68 receives a rotary motion, typically from the engine 21 of the motor grader 10, and produces high hydraulic pressure. Low pilot pressure is provided by a hydraulic pressure reducing valve, represented by block 70. The hydraulic pressure reducing valve 70 receives high hydraulic pressure from the hydraulic pump 68 and supplies low pilot pressure to the electro-hydraulic actuators 66.

Each electro-hydraulic actuator 66 includes an electrical drive solenoid and a hydraulic valve. The solenoid receives control signals from the electronic control computer 64 and produces a controlled mechanical movement of a core stem of the actuator 66. The hydraulic valve receives both the controlled mechanical movement of the core stem of the actuator 66 and low pilot pressure from the hydraulic pressure reducing valve 70 and produces controlled pilot hydraulic pressure for hydraulic valves, represented by block 72.

The hydraulic valves 72 receive both controlled pilot hydraulic pressure from the electro-hydraulic actuators 66 and high hydraulic pressure from the hydraulic pump 68 and produce controlled high hydraulic pressure for hydraulic actuators, cylinders, and motors, represented by block 74.

The hydraulic actuators, cylinders, and motors 74 receive controlled high hydraulic pressure from the hydraulic valves 72 and produce mechanical force to move the front frame 12 of the grader 10 and several mechanical linkages, represented by block 76. As described above, movement of the front frame 12 of the grader 10 with respect to the rear frame 14 of the grader 10 establishes the articulation angle. Movement of the mechanical linkages establishes the position of the blade 16 or other implements.

Each hydraulic actuator, cylinder, and motor 74, such as the lift cylinders 28 and 30 and the circle drive motor 40, includes an electronic position sensor, represented by block 78. The electronic position sensors 78 transmit information regarding the position of its respective hydraulic actuator, cylinder, or motor 76 to the electronic control computer 64. In this manner, the control computer 64 can, for example, determine the articulation angle of the grader 10 and position the blade 16. With such information, the control computer 64 can perform additional operations.

In FIG. 3 a dual function throttle control system is shown generally at 84. Throttle control system 84 comprises a hand lever 86 that is connected to and pivotable about a hand lever pivot 88. A foot pedal 90 is connected to and pivotable about a foot pedal pivot 92. Electrical connections 94 connect both hand lever 86 and foot pedal 90 to proportional directional hydraulic valves 96. Throttle control system 84 includes a hydraulic tank 98 that supplies hydraulic fluid to hydraulic pump 68. Throttle control system 84 further includes an engine speed actuator 100. Actuation of engine speed actuator 100 controls the speed of engine 21. Throttle control system 84 also includes a three position spring-centered hydraulic valve 102, which is shown at a first position in FIG. 3. When hydraulic valve 102 is at the first position it is closed. Hydraulic valve 102 includes a valve body 104 having a first portion 106, a second portion 108 and a third portion 110. A first solenoid 112 and a first spring 114 are located adjacent third portion 110. A second solenoid 116 and a second spring 118 are located adjacent first portion 106. An electrical connection 120 connects first solenoid 112 to a first switch 122. An electrical connection 124 connects second solenoid 116 to a second switch 126. A plurality of hydraulic lines 128 connect hydraulic tank 98 to hydraulic pump 68, both of which are connected to proportional directional hydraulic valves 96, hydraulic valve 102, and engine speed actuator 100. Hand lever 86 pivots about hand lever pivot 88 in a first direction and a second direction as shown by an arrow 130. Likewise, foot pedal 90 pivots about foot pedal pivot 92 in the direction of an arrow 132.

Hand lever 86 is shown in FIG. 3 in a centered position. Full rotation of hand lever 86 permits hand lever 86 to contact and close first switch 122 when hand lever 86 is maximally rotated in a clockwise direction in FIG. 3. Maximal rotation of hand lever 86 in the counter clockwise direction permits hand lever 86 to close second switch 126. As hand lever 86 is rotated from a position in contact with first switch 122 toward second switch 126 electrical connection 94 and hydraulic valve 96 proportionally actuate engine speed actuator 100 to increase the speed of engine 21. Likewise, rotation of hand lever 86 from second switch 126 toward first switch 122 produces a proportional decrease in the speed of engine 21.

When hand lever 86 is in contact with first switch 122 first solenoid 112 is actuated and moves hydraulic valve 102 to a second position that positions third portion 110 of hydraulic valve 102 in alignment with hydraulic lines 128. When hydraulic valve 102 is at the second position, rotation of foot pedal 90 in a counter clockwise direction actuates proportional directional hydraulic valve 96 to direct hydraulic fluid through hydraulic valve 102 to engine speed actuator 100. Thus, when hand lever 86 is in contact with first switch 122 counter clockwise rotation of foot pedal 90 increases the hydraulic pressure on engine speed actuator 100 and thus increases the speed of engine 21. When hand lever 86 is in contact with second switch 126 second solenoid 116 is actuated and moves hydraulic valve 102 to a third position that positions first portion 106 of valve body 104 into alignment with hydraulic lines 128. When hydraulic valve 102 is in the third position, rotation of foot pedal 90 in a counter clockwise direction actuates proportional directional hydraulic valve 96 and the structure of first portion 106 permits a release of hydraulic pressure on engine speed actuator 100. Thus, when hand lever 86 is in contact with second switch 126 counter clockwise rotation of foot pedal 90 results in a decrease in the speed of engine 21. In summary, three position spring-centered hydraulic valve 102 permits foot pedal 90 to operate both as an accelerator and a decelerator depending on the position of hand lever 86 relative to first switch 122 and second switch 126. When hand lever 86 is between contact with first switch 122 and second switch 126 first solenoid 112 and second solenoid 116 are not actuated, and first spring 114 and second spring 118 maintain hydraulic valve 102 at the first position. Thus, foot pedal 90 does not adjust the speed of engine 21. Proportional directional hydraulic valves 96 are actuated through either a rheostat or a potentiometer that form a part of electrical connections 94 as is known in the art. In this manner, the relative rotation of hand lever 86 or foot pedal 90 may be used to proportionally control the opening of hydraulic valves 96.

INDUSTRIAL APPLICABILITY

The present invention relates generally to a dual function throttle control for earthmoving machines such as wheel loaders and motor graders. In the specification, use of the dual function throttle control has been illustrated in a motor grader 10. It will be understood by one of ordinary skill in the art that the present invention is readily adaptable to use in other earthmoving machines such as wheel loaders, excavators, bulldozers, and the like. Motor grader 10 is provided with a dual mechanism for speed control that comprises a dual function throttle control system 84. The throttle control system 84 includes a hand lever 86 and a foot pedal 90. Both the hand lever 86 and foot pedal 90 are pivotable about a hand lever pivot 88 and a foot pedal pivot 92, respectively. Hand lever 86 is connected to an engine speed actuator 100 through a proportional direction hydraulic valve 96. Rotation of hand lever 86, acting through hydraulic valve 96, controls the actuation of engine speed actuator 100 and thus the speed of engine 21. Foot pedal 90 is also connected to a proportional directional hydraulic valve 96 that is also connected to the engine speed actuator 100. Between the hydraulic valve 96 connected to foot pedal 90 and engine speed actuator 100 is a three position spring-centered hydraulic valve 102. The direction of flow of hydraulic fluid through hydraulic valve 102 is controlled by the position of hydraulic valve 102. The position of hydraulic valve 102 is adjusted by actuation of a first switch 122 or a second switch 126 by hand lever 86. When first switch 122 is activated hydraulic valve 102 permits rotation of foot pedal 90 to actuate engine speed actuator 100 and thus increase the speed of engine 21. When second switch 126 is activated hydraulic valve 102 translates rotation of foot pedal 90 into a decrease in actuation of engine speed actuator 100 and thus decreases the speed of engine 21.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

I claim:

1. A dual function throttle control system for an earthmoving machine, comprising:

a foot pedal connected to a three position spring centered hydraulic valve;

said three position spring centered hydraulic valve connected to an engine speed actuator and movable between a first position, a second position, and a third position;

said three position spring centered hydraulic valve closed when at said first position;

rotation of said foot pedal in a first direction when said three position spring centered hydraulic valve is at said second position increasing actuation of said engine speed actuator and thereby increasing an engine speed; and rotation of said foot pedal in said first direction when said three position spring centered hydraulic valve is at said third position decreasing actuation of said engine speed actuator and thereby decreasing an engine speed.

2. A dual function throttle control system, as recited in claim 1, further comprising a proportional directional hydraulic valve;

said proportional directional hydraulic valve electrically controlled by rotation of said foot pedal and located between said foot pedal and said three position spring centered hydraulic valve;

said proportional directional hydraulic valve increasing said actuation of said engine speed actuator in proportion to the amount of rotation of said foot pedal in said first direction when said three position spring centered hydraulic valve is at said second position; and said proportional directional hydraulic valve decreasing said actuation of said engine speed actuator in proportion to the amount of rotation of said foot pedal in said first direction when said three position spring centered hydraulic valve is at said third position.

3. A dual function throttle control system, as recited in claim 1, further comprising:

a hand lever rotatable in a first direction and in a second direction opposite said first direction;

said hand lever connected to said engine speed actuator through a proportional directional hydraulic valve; and rotation of said hand lever in said first direction increasing actuation of said engine speed actuator, thereby increasing said engine speed, and rotation of said hand lever in said second direction decreasing actuation of said engine speed actuator, thereby decreasing said engine speed.

4. A dual function throttle control system, as recited in claim 3, further comprising a first switch connected to a first solenoid having a first spring and a second switch connected to a second solenoid having a second spring;

said first switch and said second switch actuatable by said hand lever;

actuation of said first switch by said hand lever actuating said first solenoid, said actuated first solenoid moving said three position spring centered hydraulic valve to said second position and actuation of said second switch by said hand lever actuating said second solenoid, said actuated second solenoid moving said three position spring centered hydraulic valve to said third position; and said first spring and said second spring maintaining said three position spring centered hydraulic valve at said first position when said first solenoid and said second solenoid are not actuated.

5. A dual function throttle control system, as recited in claim 4, wherein said hand lever actuates said first switch when said hand lever is rotated maximally in said second direction and wherein said hand lever actuates said second switch when said hand lever is rotated maximally in said first direction.

* * * * *